United States Patent
Medina Huerta et al.

(10) Patent No.: US 10,421,409 B2
(45) Date of Patent: Sep. 24, 2019

(54) APPARATUS FOR HOLDING A CELL PHONE, A CUP AND OTHER ITEMS IN A MOTOR VEHICLE

(71) Applicant: FORD GLOBAL TECHNOLOGIES, LLC, Dearborn, MI (US)

(72) Inventors: Mario Alejandro Medina Huerta, Mexico City (MX); Jorge Arturo Ortiz Flores, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/862,191

(22) Filed: Jan. 4, 2018

(65) Prior Publication Data
US 2019/0202365 A1    Jul. 4, 2019

(51) Int. Cl.
| | | |
|---|---|---|
| *B60R 11/02* | (2006.01) | |
| *B60R 7/08* | (2006.01) | |
| *B60R 7/06* | (2006.01) | |
| *B60R 11/00* | (2006.01) | |

(52) U.S. Cl.
CPC .................. *B60R 7/08* (2013.01); *B60R 7/06* (2013.01); *B60R 11/0241* (2013.01); *B60R 2011/0005* (2013.01); *B60R 2011/0045* (2013.01); *B60R 2011/0071* (2013.01); *B60R 2011/0082* (2013.01)

(58) Field of Classification Search
CPC ............. B60R 2011/0082; B60R 11/02; Y10S 224/926; Y10S 224/929; B60N 3/106; B60N 3/102
USPC ........................................ 224/501, 552, 929
See application file for complete search history.

(56) References Cited

U.S. PATENT DOCUMENTS

| | | | | |
|---|---|---|---|---|
| 4,783,037 A | * | 11/1988 | Flowerday | B60N 3/102 248/311.2 |
| 5,187,744 A | * | 2/1993 | Richter | B60R 11/0241 224/553 |
| 5,507,423 A | * | 4/1996 | Fischer | B60R 7/10 224/281 |
| 5,618,018 A | | 4/1997 | Baniak | |
| 5,897,089 A | * | 4/1999 | Lancaster | B60N 3/102 248/311.2 |
| 6,692,053 B1 | | 2/2004 | Smith | |
| 6,908,135 B2 | | 6/2005 | Stahmer et al. | |

(Continued)

FOREIGN PATENT DOCUMENTS

| | | |
|---|---|---|
| CN | 205395873 U | 7/2016 |
| GB | 2439985 A | 1/2008 |

(Continued)

OTHER PUBLICATIONS

English Machine Translation of CN205395873U.

(Continued)

*Primary Examiner* — Adam J Waggenspack
(74) *Attorney, Agent, or Firm* — Vichit Chea; King & Schickli, PLLC

(57) ABSTRACT

An apparatus for holding various items such as a drink cup and a smart phone, includes a plunger and a holding device. The plunger includes a proximal end and a distal end. The holding device is carried on the distal end of the plunger. The holding device includes a first jaw and a second jaw opposed to the first jaw. A method of gripping an item in the apparatus is also disclosed.

12 Claims, 12 Drawing Sheets

(56) References Cited

U.S. PATENT DOCUMENTS

| | | | |
|---|---|---|---|
| 6,942,267 B1 | 9/2005 | Sturt | |
| 7,337,934 B2 * | 3/2008 | Alling | F16B 2/10 |
| | | | 224/401 |
| 8,885,338 B1 * | 11/2014 | Simpson | A45F 5/10 |
| | | | 224/929 |
| 9,014,393 B2 * | 4/2015 | Huh | B60R 11/02 |
| | | | 381/386 |
| 2009/0218454 A1 * | 9/2009 | Stanley | F16M 13/00 |
| | | | 248/121 |
| 2014/0187156 A1 * | 7/2014 | Bane | B60K 37/02 |
| | | | 455/41.1 |
| 2017/0250563 A1 | 8/2017 | Davison et al. | |
| 2018/0228697 A1 * | 8/2018 | Dedvukaj | A61J 9/06 |
| 2018/0266455 A1 * | 9/2018 | Smith | B60R 11/02 |

FOREIGN PATENT DOCUMENTS

| | | |
|---|---|---|
| JP | 2017061258 A | 3/2017 |
| KR | 101665247 B1 | 10/2016 |
| WO | 2016110347 A1 | 7/2016 |

OTHER PUBLICATIONS

English Machine Translation of JP2017061258A.
English Machine Translation of KR101665247B1.
English Machine Translation of WO2016110347A1.

\* cited by examiner

APPARATUS FOR HOLDING A CELL PHONE, A CUP AND OTHER ITEMS IN A MOTOR VEHICLE

TECHNICAL FIELD

This document relates generally to the motor vehicle equipment field and, more particularly, to a new and improved apparatus capable of efficiently and effectively holding various items in an easily reached and in an ergonomically useful orientation.

BACKGROUND

This document relates to a new and improved apparatus adapted to efficiently hold various items in a conveniently reached position and in a more useful, ergonomically enhanced orientation. Advantageously, the apparatus may be located in the instrument panel along the center stack where it may be concealed from view when not in use and easily deployed as desired. Advantageously, the device may be easily adjusted to hold various items including, for example, a cup or a cell phone. Advantageously, the apparatus allows space optimization as well as enhanced versatility in function and application, resulting in enhanced customer satisfaction.

SUMMARY

A new and improved apparatus is provided for holding various items at a convenient to use location in an efficient and effective manner. That apparatus comprises a plunger, including a proximal end and a distal end, and a holding device carried on the distal end of the plunger. The holding device includes a first jaw and a second jaw opposed to the first jaw.

The apparatus may further include a pivot connecting the holding device to the distal end of the plunger. The pivot allows one to rotate the holding device on the plunger between a first position and a second position. This allows the holding device to better function for multiple applications. More specifically, the pivot feature allows the holding device to be positioned in multiple orientations so as to better accommodate and hold different items for use. The apparatus may also include a biasing element for biasing the first jaw and the second jaw toward a closed position whereby the holding device may be utilized to hold various items of different shapes and sizes.

The apparatus may also include a charging device carried on the plunger. That charging device may be an inductive charger adapted to provide wireless charging function for various types of electronic devices. The apparatus may also include a extendable stalk carried on a free end of the plunger. The charging device may be carried on that extendable stalk.

The apparatus may further include a housing. That housing may have a cavity. The holding device may be held in the cavity when the plunger is in a retracted position and the holding device may project from the housing when the plunger is in an extended position. A push-push actuator may be provided to displace the plunger between the retracted position and the extended position. The push-push actuator may include a biasing spring and a retraction guide carried on the housing and a guide pin carried on the plunger.

Still further, the first jaw and the second jaw of the apparatus may include a plurality of resilient fingers. These resilient fingers function to provide enhanced gripping ability so that the first and second jaw more efficiently and effectively grip an item held in the device holder regardless of its shape.

In accordance with an additional aspect, a method is provided of gripping an item in an apparatus including a plunger and a holding device carried on the plunger. That method comprises the steps of: (a) extending the holding device from a housing, (b) angularly orienting the holding device on the plunger and (c) inserting an item to be held in the holding device into the holding device.

The method may include operatively connecting the item held in the holding device to a charging device carried on the plunger. The step of angularly orienting the holding device may include rotating the holding device on the plunger. The step of inserting the item into the holding device may include the step of positioning the item between a first jaw and a second jaw.

The step of operatively connecting the item to the charging device may include extending a telescoping device carried on the plunger to displace the charging device toward the item carried between the first jaw and the second jaw. Further the method may include the step of providing a positive force for gripping the item between the first jaw and the second jaw.

In the following description, there are shown and described several preferred embodiments of the apparatus and the related method of gripping an item in an apparatus. As it should be realized, the apparatus and method are capable of other, different embodiments and their several details are capable of modification in various, obvious aspects all without departing from apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of apparatus and method and together with the description serve to explain certain principles thereof.

Figure 5A:
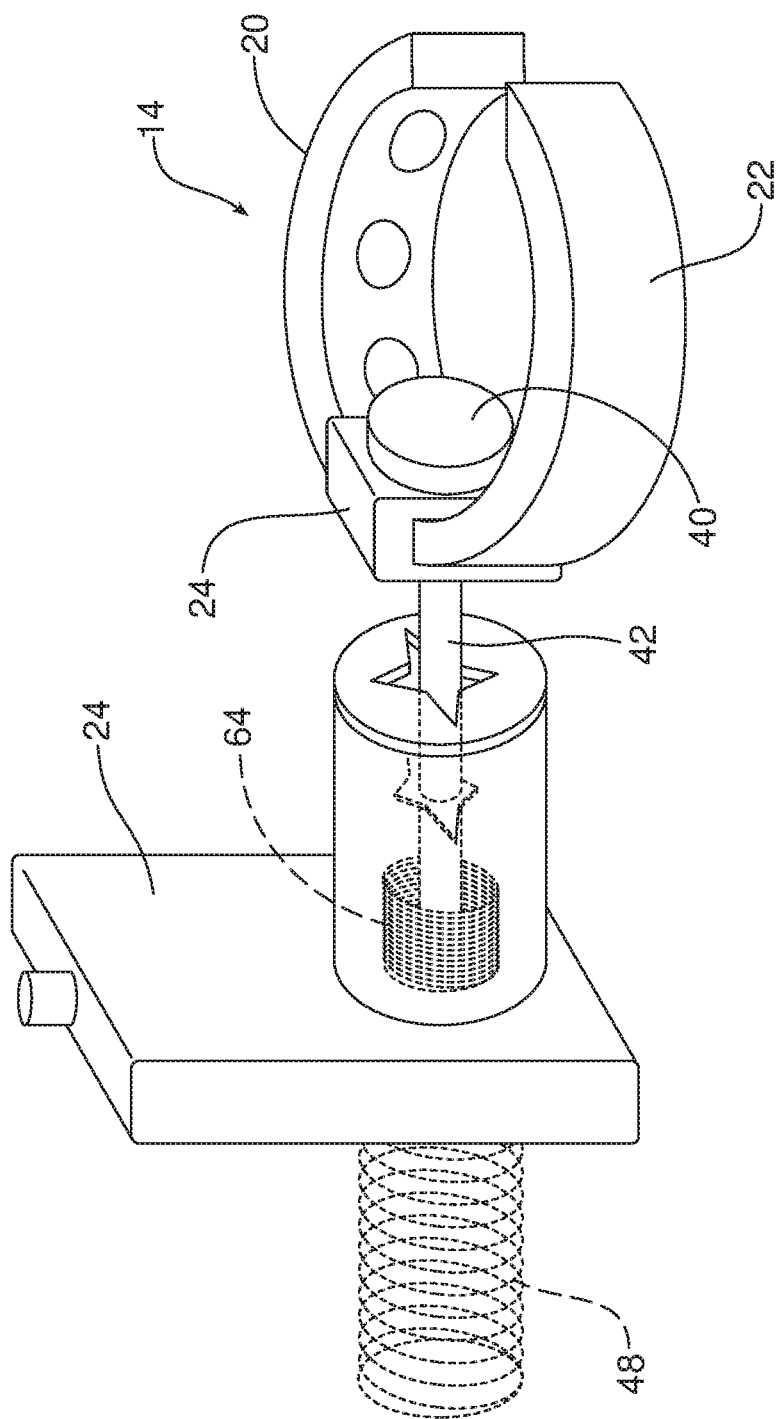
FIGS. 5a and 5b illustrate an alternative embodiment of the apparatus incorporating a charging device in the form of an inductive charger carried on a extendable stalk at the end of the plunger of the apparatus between the first and second jaws of the holding device.

More specifically, FIG. 5a illustrates the alternative embodiment with the inductive charger in the retracted position.

Figure 5B:
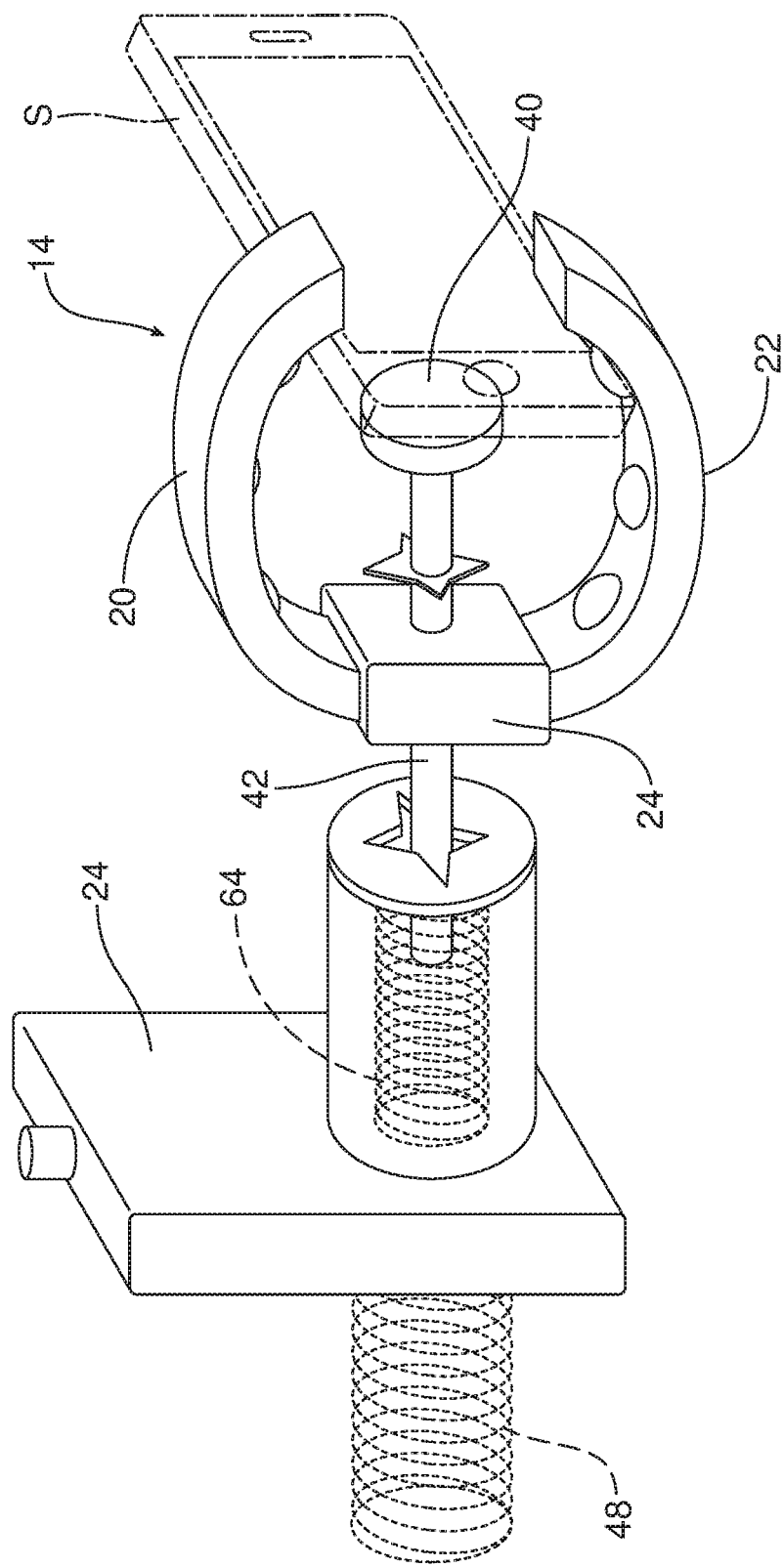

FIG. 5b illustrates the alternative embodiment of the apparatus with the inductive charger in an extended position so as to engage the rear of the cell phone and provide for inductive charging of the cell phone.

Reference will now be made in detail to the present preferred embodiments of the apparatus, examples of which are illustrated in the accompanying drawing figures.

DETAILED DESCRIPTION

Figure 1A:
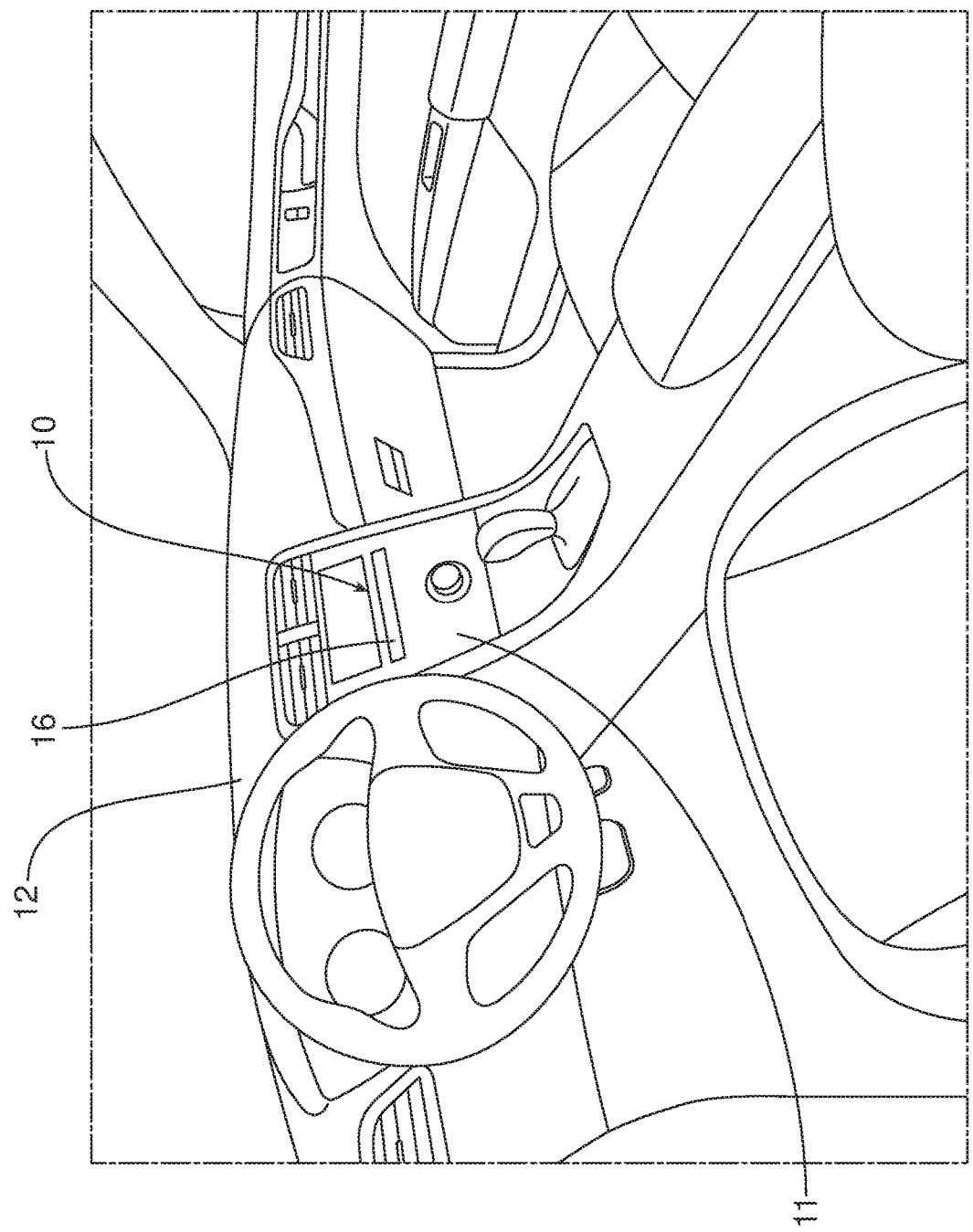
FIG. 1a is perspective view of the interior of a motor vehicle equipped with the new and improved apparatus shown in the stowed or concealed position.
Figure 1B:
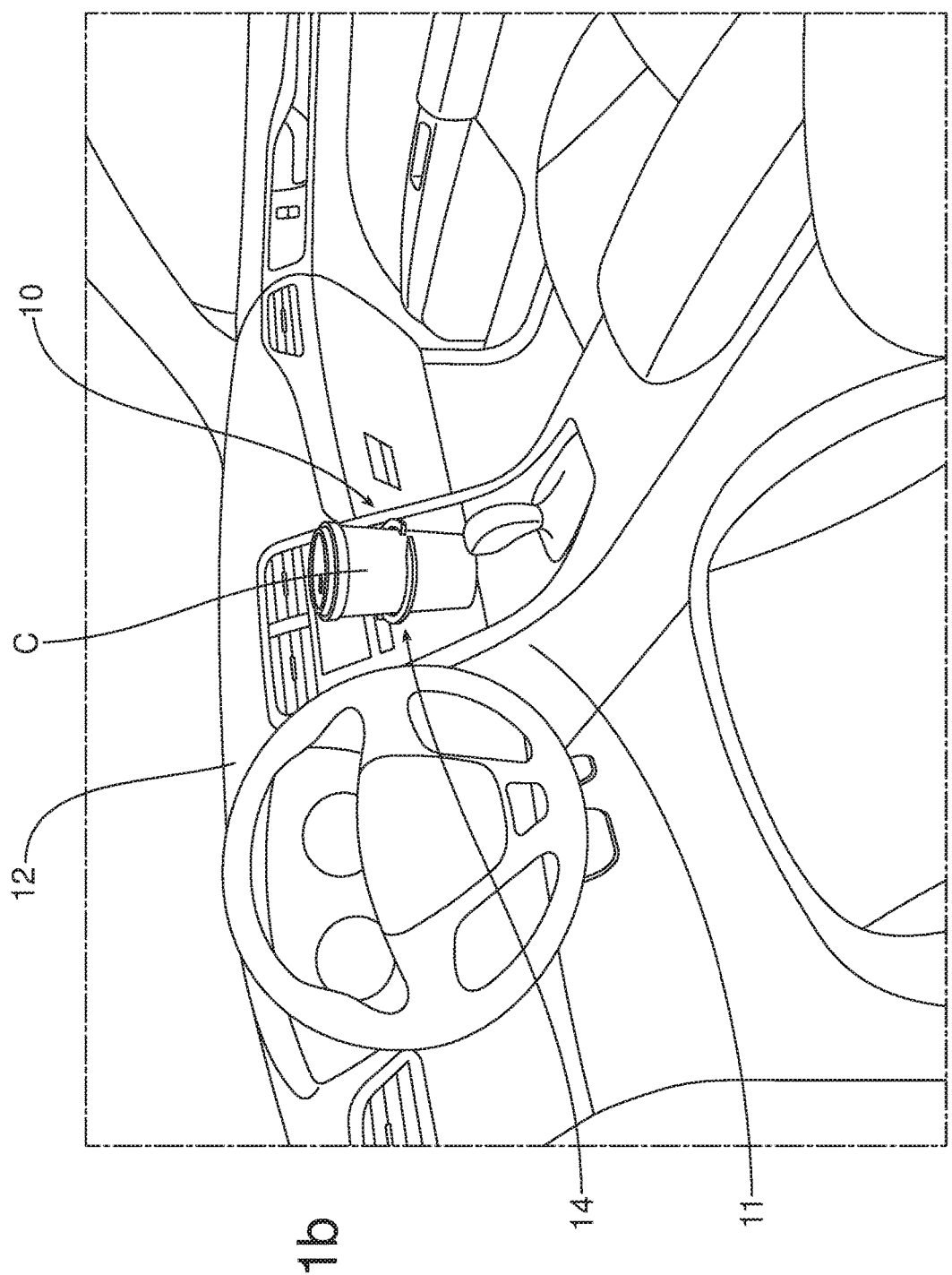
FIG. 1b is a view similar to FIG. 1a but illustrating the apparatus deployed into a first operating configuration and holding a drink cup.
Figure 1C:
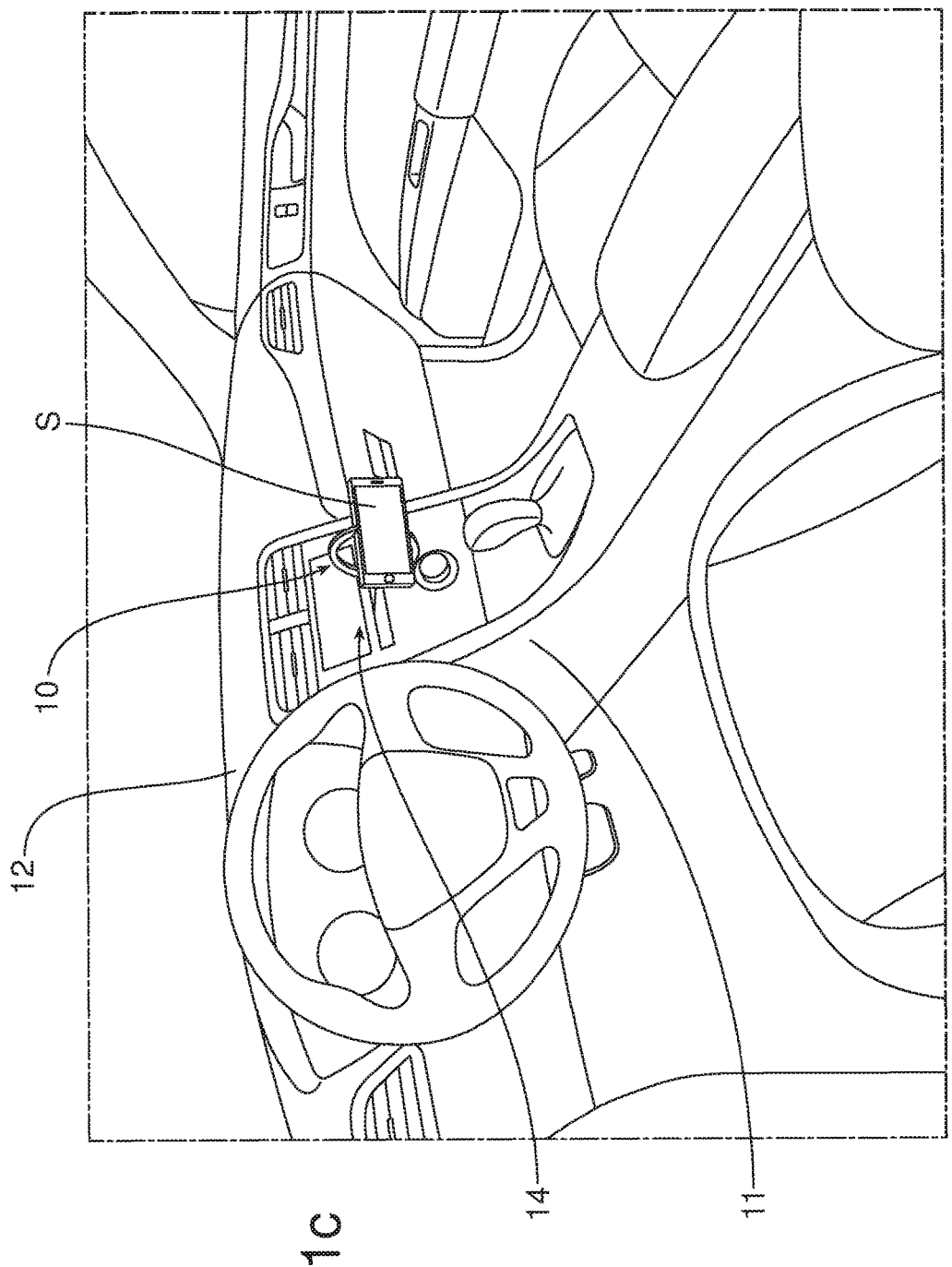
FIG. 1c is a view similar to FIG. 1b but illustrating the apparatus deployed into a second operating position holding a cell phone.

Reference is now made to FIGS. 1a-1c illustrating the new and improved apparatus 10 for holding an object or item such as a drink cup C or smart phone S in an easily reached, convenient and useful orientation. In the illustrated embodiment, the apparatus 10 is mounted in the center stack 11 of the instrument panel 12. FIG. 1 illustrates the apparatus 10 in a stowed or home position. FIGS. 1b and 1c illustrate the apparatus 10 in a deployed position. In FIG. 1b the holding device 14 of the apparatus 10 is in a first, substantially horizontal orientation adapted to hold the drink cup C. In FIG. 1c, the holding device 14 is in a second, substantially vertical orientation adapted to hold the smart phone S. In the stowed or home position illustrated in FIG. 1a, the holding device 14 is concealed from view by a cover or door 16 of the apparatus housing 18.

Figure 2:
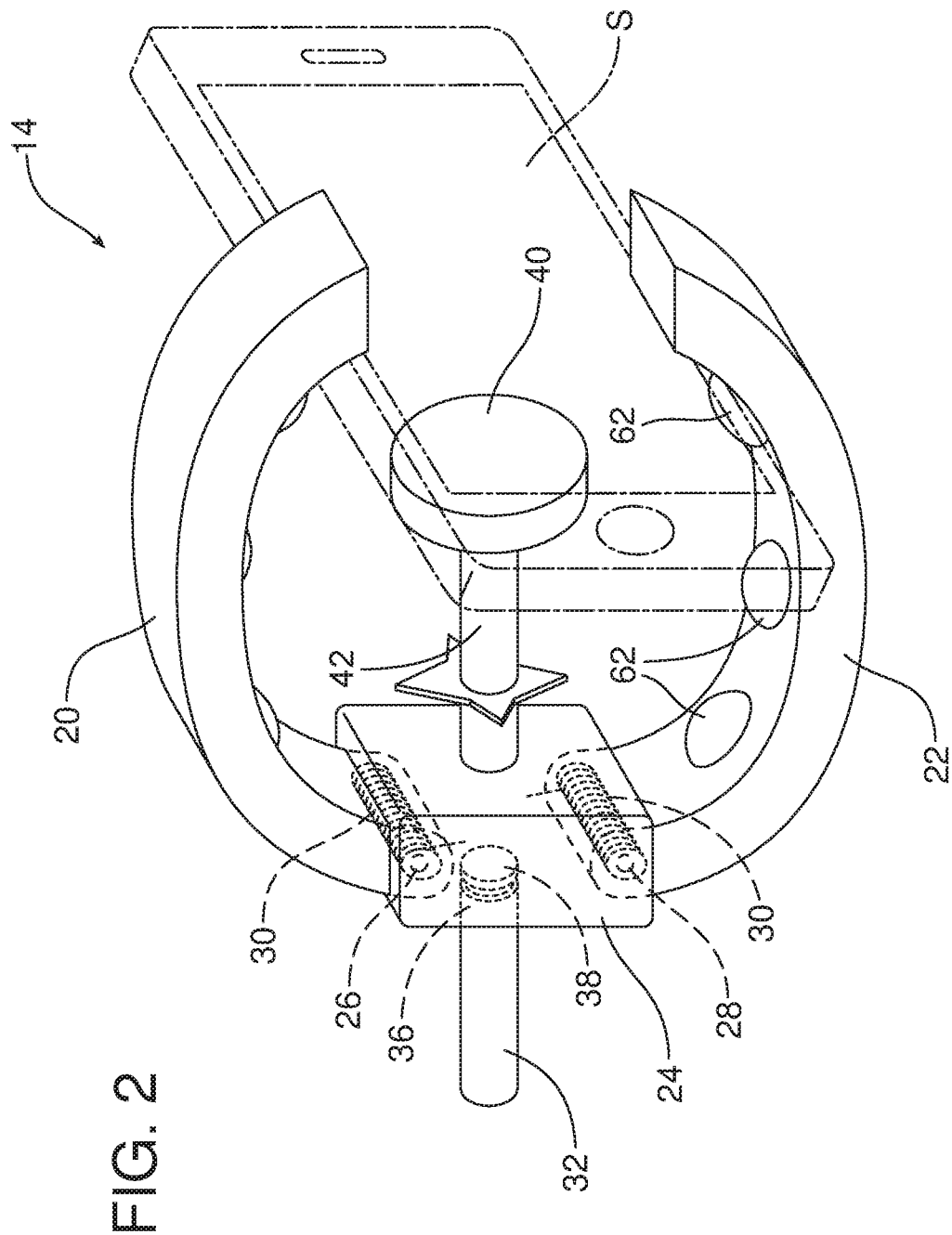
FIG. 2 is a detailed perspective view of the structure for biasing the jaws toward a closed position so as to provide positive gripping force to an object to be held in the jaws.

As best illustrated in FIG. 2, the holding device 14 includes a first jaw 20 and a second jaw 22 opposed to the first jaw. More particularly, the first jaw 20 is pivotally connected to a jaw support 24 by a first pivot pin 26. The second jaw 22 is pivotally connected to the jaw support 24 by a second pivot pin 28. A biasing element 30 biases the first jaw 20 and the second jaw 22 together toward a closed position. In the illustrated embodiment the biasing element 30 comprises a first torsion spring concentrically received around the first pivot pin 26 and a second torsion spring concentrically received around the second pivot pin 28. As further illustrated in FIGS. 2, 3a-3d and 4a-4d, the apparatus 10 also includes a plunger 32 having a proximal end 34 and a distal end 36. The holding device 14 is pivotally connected to the distal end 36 of the plunger 32 so that the holding device may be rotated between the first position or configuration illustrated in FIG. 1b and the second position or configuration illustrated in FIG. 1c. More specifically, a pivot 38 connects the jaw support 24 of the holding device 14 to the distal end 36 of the plunger.

A charging device 40 such as an inductive charger, may be carried on the plunger 32. In the illustrated embodiment, the charging device 40 is carried on a extendable stalk 42 carried on or attached to the jaw support 24 at the distal end 36 of the plunger 32. The operation of the extendable stalk 42 and the function of the charging device 40 will be discussed in greater detail below.

Figure 3A:
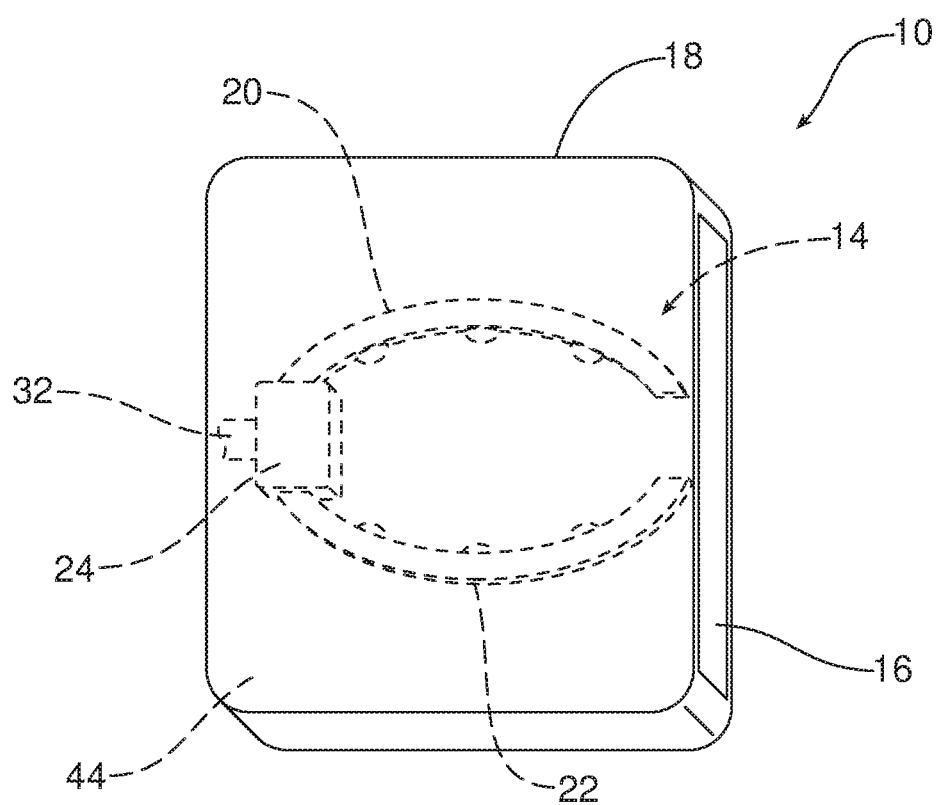
FIGS. 3a-3d are a series of views illustrating how the holding device of the apparatus is deployed from the housing of the apparatus.
Figure 3B:
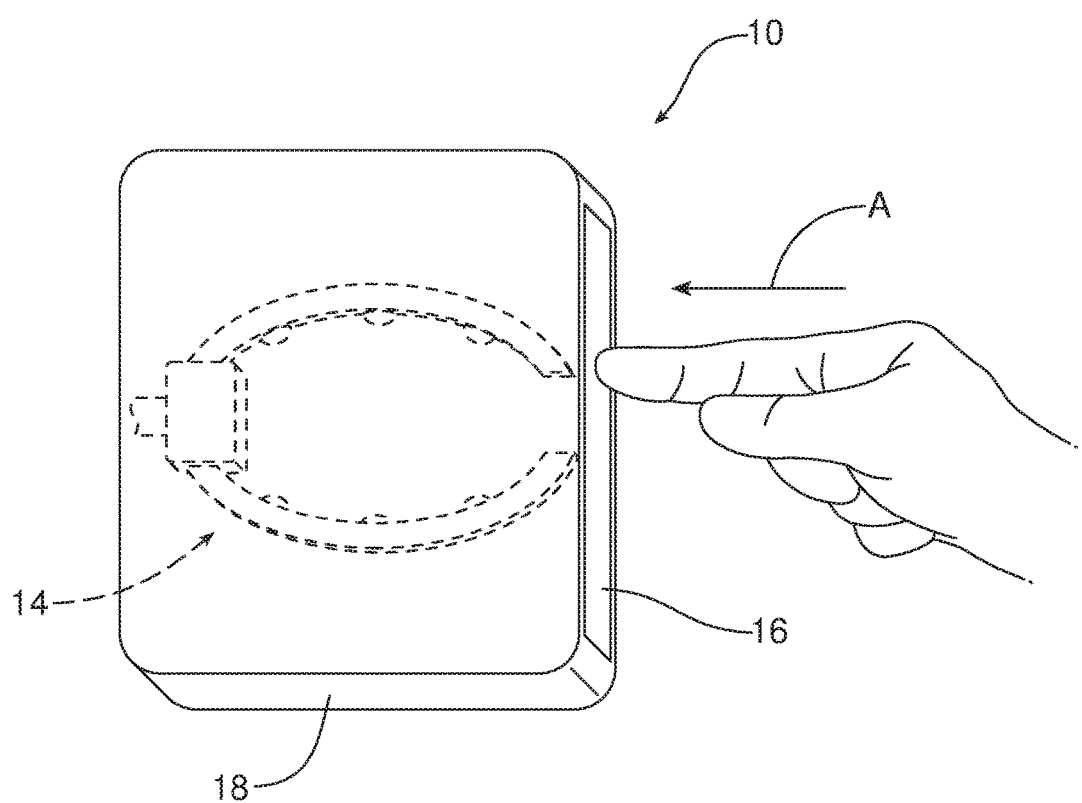
Figure 3C:
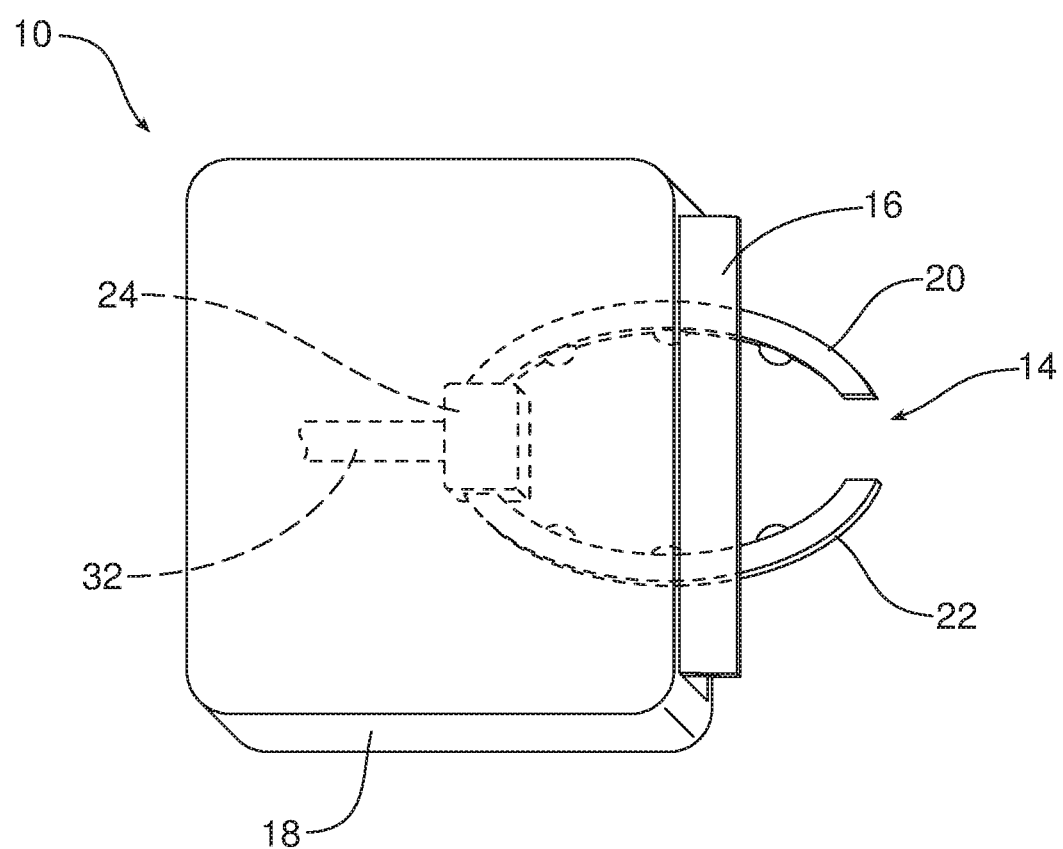
Figure 3D:
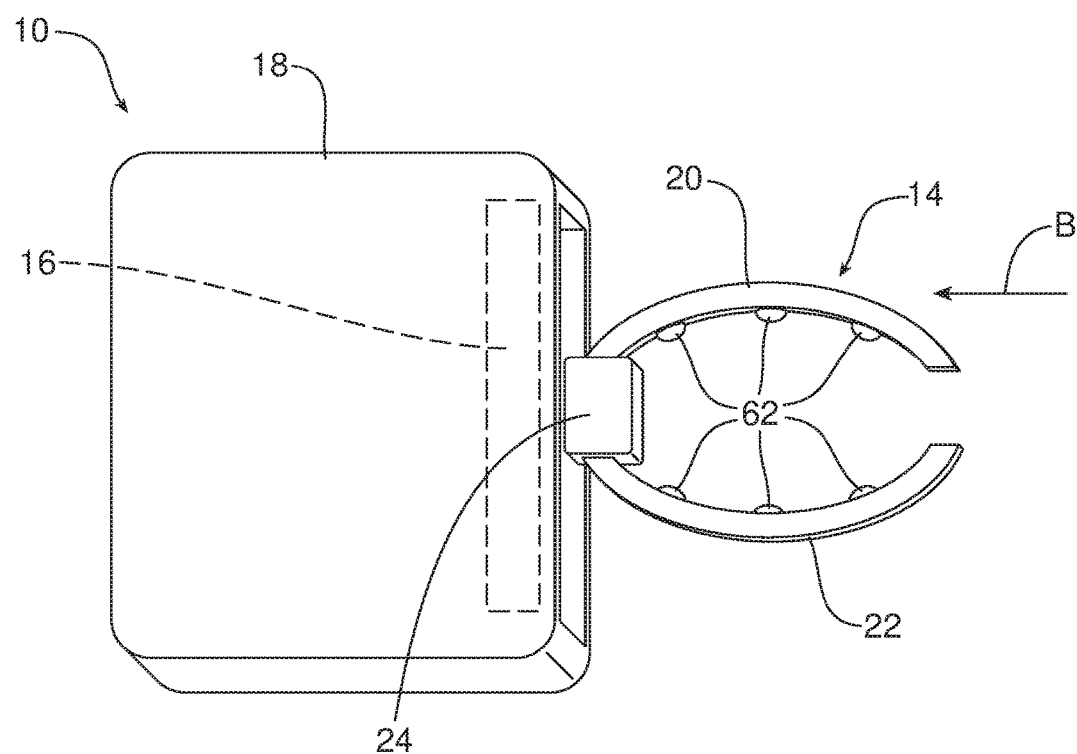

As best illustrated in FIGS. 3a-3d and 4a-4d, the apparatus housing 18 includes a cavity 44. As illustrated in FIGS. 1a and 3a, the holding device 14 is held in the cavity 44 when the plunger 32 is in the retracted, home or stowed position. In contrast, the holding device 14 projects from the apparatus housing 18 through the cover or door 16 when the plunger 32 is extended into a deployed position as shown in FIGS. 1b, 1c and 3d. A push-push actuator 46 may be utilized to displace the plunger 32 between the retracted and extended positions and the holding device 14 between the home or stowed position illustrated in FIG. 1a and the deployed position illustrated in FIGS. 1b and 1c.

Figure 4A:
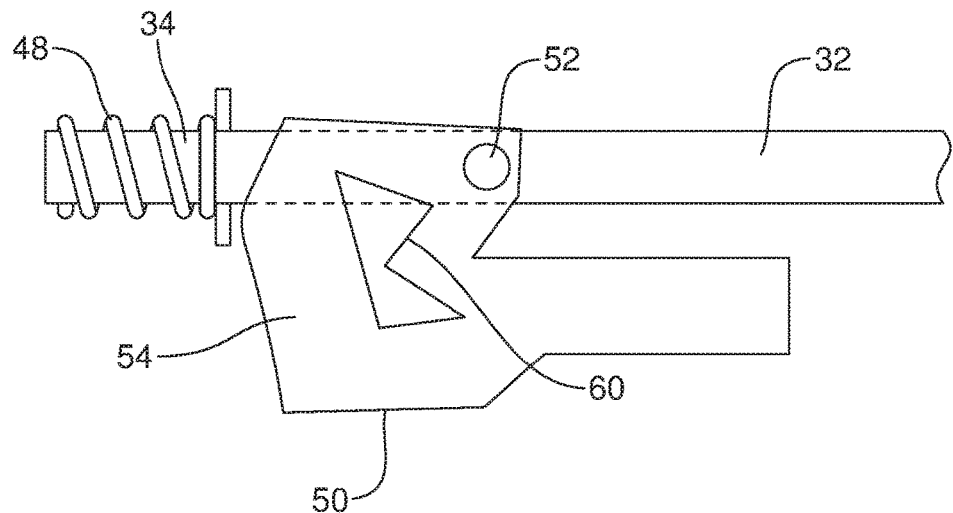
FIGS. 4a-4d are a series of detailed schematic views illustrating the retraction guide and guide pin of the push-push actuator of the apparatus in positions corresponding respectively with the positions of the holding device illustrated in FIGS. 3a-3d.
Figure 4B:
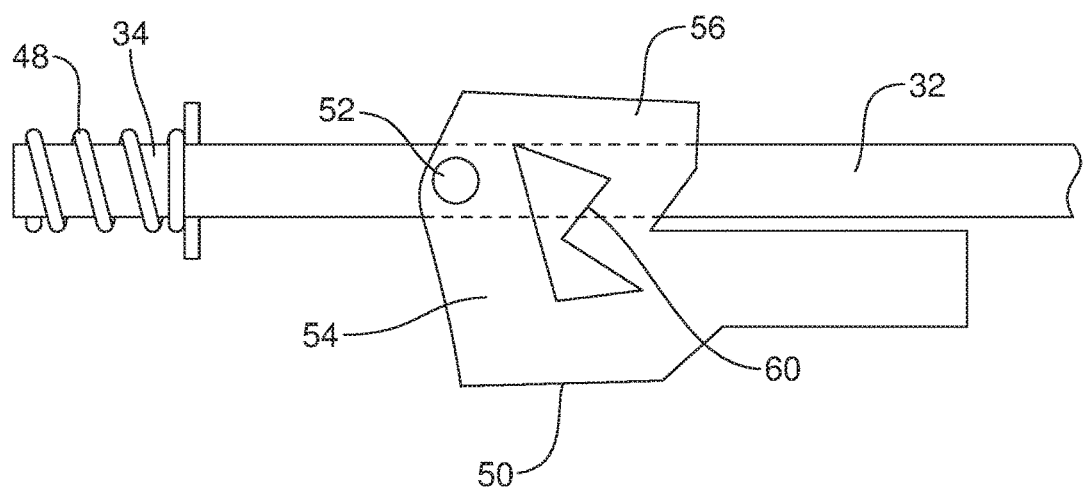
Figure 4C:
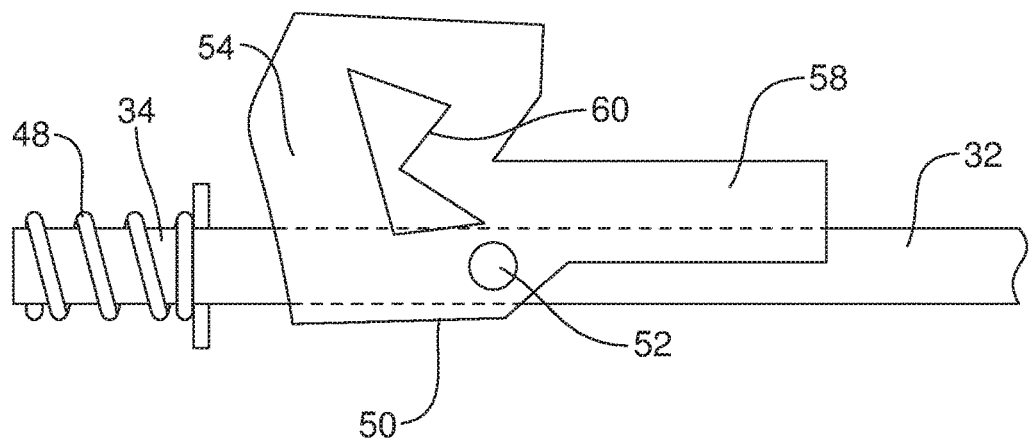

As schematically illustrated in FIGS. 4a-4d, that push-push actuator 46 may be of a type known in the art including a biasing spring 48 and a retraction guide 50 carried on the apparatus housing 18 and a guide pin 52 carried on the plunger 32. More specifically, the retraction guide 50 includes a guide track 54. The guide pin 52 travels along the guide track 54 as the holding device 14 is displaced between the home or stowed position and the deployed position. As illustrated in FIGS. 3a and 4a, when the holding device 14 is in the home or stowed position and the plunger 32 is fully retracted within the apparatus housing 18, the guide pin 52 is located in the upper right corner of the guide track 54.

Figure 4D:
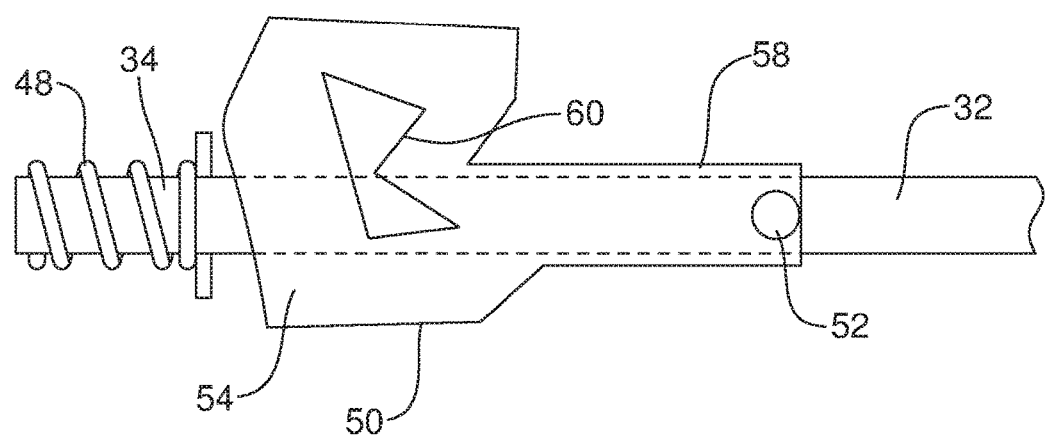

When one wishes to deploy the holding device 14, one pushes on the cover/door 16 of the apparatus housing 18 (note action arrow A in FIG. 3b) thereby causing the holding device 14 and plunger 32 to retract further into the apparatus housing 18. As this occurs, the guide pin 52 travels along the upper portion 56 of the guide track 54 from the position illustrated in FIG. 4a to the position illustrated in FIG. 4b. Upon releasing the cover/door 16, the biasing spring 48 biases the plunger 32 toward the extended position (note action arrow B in FIG. 3c) simultaneously displacing (a) the cover/door open and (b) the holding device toward the deployed position. As this occurs, the guide pin 52 moves along the guide track 54 from the position illustrated in FIG. 4b to the position illustrated in FIG. 4c. When the holding device 14 is in the fully deployed position projecting from the apparatus housing 18 as illustrated in FIG. 3d, the guide pin 52 has traveled along the guide track 54 from the position illustrated in FIG. 4c to the position illustrated in FIG. 4d at the end of the longitudinal section 58 as illustrated in FIG. 4d.

When one wishes to return the holding device 14 to the home or stowed position, one presses the holding device back into the apparatus housing 18 (note action arrow B in FIG. 3d) against the force of the biasing spring 48 until the guide pin 52 is returned by the cam 60 of the retraction guide 50 to the position illustrated in FIG. 4a where the interaction of the guide pin 52 with the retraction guide 50 functions to hold the plunger 32 in the retracted position with the holding device 14 fully concealed within the apparatus housing 18 behind the cover/door 16. A spring (not shown) then closes the cover/door 16. Here it should be appreciated that the various faces of the B-shaped cam 60 ensure proper operation, movement and function of the holding device 14 between the home or stowed position and the deployed position.

The apparatus 10 may be utilized in a method of gripping an item such as a drinking cup C or a smart phone S. That method includes the steps of extending the holding device 14 from the apparatus housing 18, angularly orienting the holding device 14 on the plunger 32 by rotating the jaw support 24 and the first and second jaws 20, 22 held thereon and inserting the item into the holding device. More specifically, the first and second jaws 20, 22 may be oriented in a substantially horizontal plane in order to hold a drinking cup C as illustrated in FIG. 1b. Alternatively, the first and second jaws 20, 22 may be rotated on the pivot 36 with respect to the plunger 32 into a substantially horizontal plane to hold the smart phone S at a desired angular orientation for viewing by the driver of the motor vehicle as illustrated in FIG. 1c. When utilized for these or any other application, a plurality of resilient fingers 62 provided along the first jaw 20 and the second jaw 22 function to provide a better, non-slip grip on the item held in the holding device 14.

More specifically, the step of angularly orienting the holding device 14 may include rotating the holding device on the plunger 32 about the pivot 38. The step of inserting the item into the holding device 14 may include the step of positioning the item between the first jaw 20 and the second jaw 22. This may be done by opening the first and second jaws against the force of the biasing element 30, positioning the item between the first and second jaws 20, 22 and then allowing the first and second jaws to close together and provide a positive force for gripping the item between the jaws.

The method may also include the step of operatively connecting the item to a charging device 40 carried on the plunger 32. This may be done by extending the extendable stalk 42 carried on the jaw support 24 at the distal end 36 of the plunger 32 to displace the charging device 40 toward the item or smart phone S carried between the first jaw 20 and the second jaw 22. Compare FIGS. 5a and 5b which illustrate the steps in detail. As illustrated in FIGS. 5a and 5b, a spring 64 may be provided to extend the extendable stalk 42 if desired.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a displaceable plunger including a proximal end and a distal end;
   a holding device carried on said distal end of said displaceable plunger, said holding device including a first jaw and a second jaw opposed to said first jaw;
   an extendable stalk carried on said distal end of said displaceable plunger; and
   a charging device carried on said extendable stalk.

2. The apparatus of claim 1, further including a pivot connecting said holding device to said distal end of said plunger whereby said holding device is rotated between a first position and a second position.

3. The apparatus of claim 2, further including a biasing element biasing said first jaw and said second jaw toward a closed position.

4. The apparatus of claim 1, wherein said charging device is an inductive charger.

5. The apparatus of claim 1, further including a housing having a cavity, said holding device being held in said cavity when said displaceable plunger is in a retracted position and said holding device projecting from said housing when said displaceable plunger is in an extended position.

6. The apparatus of claim 5, further including a push-push actuator to displace said displaceable plunger between said retracted position and said extended position.

7. The apparatus of claim 6, wherein said push-push actuator includes a biasing spring and a retraction guide carried on said housing and a guide pin carried on said displaceable plunger.

8. The apparatus of claim 7, wherein said first jaw and said second jaw both include a plurality of resilient fingers to grip an item held in said holding device.

9. A method of gripping an item in an apparatus including a plunger and a holding device carried on said plunger, comprising:
   extending said holding device from a housing;
   angularly orienting said holding device on said plunger;
   inserting said item into said holding device;
   operatively connecting said item to a charging device carried on said plunger by extending an extendable stalk carried on said plunger to displace said charging device toward said item carried by said holding device.

10. The method of claim 9, wherein angularly orienting said holding device includes rotating said holding device on said plunger.

11. The method of claim 10, wherein inserting said item into said holding device includes positioning said item between a first jaw and a second jaw.

12. The method of claim 11, including providing a positive force for gripping said item between said first jaw and said second jaw.

* * * * *